(12) United States Patent
Sabater

(10) Patent No.: US 10,345,105 B2
(45) Date of Patent: Jul. 9, 2019

(54) SIMPLIFIED TIME DOMAIN SWITCHED RING/DISK RESONANT GYROSCOPE

(71) Applicant: SPAWAR Systems Center Pacific, San Diego, CA (US)

(72) Inventor: Andrew B. Sabater, Claremont, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 218 days.

(21) Appl. No.: 15/610,371

(22) Filed: May 31, 2017

(65) Prior Publication Data

US 2018/0347985 A1    Dec. 6, 2018

(51) Int. Cl.
  *G01C 19/5726*  (2012.01)
  *G01C 19/5684*  (2012.01)
  *G01C 19/5755*  (2012.01)

(52) U.S. Cl.
  CPC ..... *G01C 19/5755* (2013.01); *G01C 19/5684* (2013.01); *G01C 19/5726* (2013.01)

(58) Field of Classification Search
  CPC .................. G01C 19/5726; G01C 19/5755
  USPC ....................................................... 73/504.13
  See application file for complete search history.

(56) References Cited

U.S. PATENT DOCUMENTS

| 7,437,253 | B2 | 10/2008 | Scheglov et al. |
| 7,526,957 | B2 | 5/2009 | Watson |
| 7,637,157 | B2 | 12/2009 | Chikovani et al. |
| 9,128,496 | B2 | 9/2015 | Waters et al. |
| 9,285,224 | B2 | 3/2016 | Afzal et al. |
| 9,389,079 | B2 | 7/2016 | Lee et al. |
| 10,027,281 | B2 * | 7/2018 | Swanson ............... G01P 15/097 |
| 2014/0331769 | A1 * | 11/2014 | Fell .................... G01C 19/5684 |
| | | | 73/504.12 |
| 2015/0038211 | A1 * | 2/2015 | Santosh ............. G07F 17/3218 |
| | | | 463/19 |

(Continued)

OTHER PUBLICATIONS

Sabater et al., "Angular Random Walk Estimation of a Time-Domain Switching Micromachined Gyroscope."

(Continued)

*Primary Examiner* — Jacques M Saint Surin
(74) *Attorney, Agent, or Firm* — NIWC Pacific; Kyle Eppele

(57) ABSTRACT

A gyroscope includes: a support frame; a circular oscillator; a flexible support structure supporting by suspension the circular oscillator to the support frame; a drive mechanism configured to induce the circular oscillator into a two-dimensional driving oscillation; a plurality of movable sections disposed at a perimeter of the circular oscillator; a plurality of digital proximity switches, each disposed near a respective movable section and around the perimeter of the circular oscillator; and a processor. The two-dimensional driving oscillation is modified responsive to an angular rotation of the support frame and the circular oscillator. The processor is operable to determine the position of each movable section, to determine the plurality of variable oscillation parameters for each oscillation of the modified drive oscillation and to determine the angular rotation of the support frame and the circular oscillator via a parametric system identification method.

11 Claims, 9 Drawing Sheets

(56) References Cited

U.S. PATENT DOCUMENTS

| | | | | |
|---|---|---|---|---|
| 2015/0354959 | A1* | 12/2015 | Senkal | G01C 19/5684 73/504.13 |
| 2016/0126890 | A1 | 5/2016 | Swanson et al. | |
| 2017/0038211 | A1* | 2/2017 | Ayazi | H03J 1/06 |
| 2017/0349271 | A1* | 12/2017 | Inquiete | B64C 27/001 |

OTHER PUBLICATIONS

Liu at al., "Research of Ring MEMS Rate Integrating Gyroscopes," World Academy of Science, Engineering and Technology Int. Journal of Electrical . . . , vol. 7, No. 4, 2013.

R. Leland, "Mechanical-thermal noise in MEMS gyroscopes," IEEE Sensors Journal, vol. 5, No. 3, pp. 493-500, 2005.

A. Trusov et al., "Flat is not dead: Current and future performance of Si-MEMS quad mass gyro (QMG) system," in Position, Location . . . 2014 IEEE/ION, May 2014, pp. 252-258.

Prikhodko et al., "Sub-degree-per-hour silicon MEMS rate sensor with 1 million Q-factor," in Transducers 2011: The 16th International Solid . . . 2011, pp. 2809-2812.

Senkal et al., "Minimal realization of dynamically balanced lumped mass WA gyroscope: dual Foucault pendulum," 2nd IEEE Int. Symp on Inertial Sensors, Hawaii, 2015, pp. 1-2.

W. Putty, M., "Micromachined vibrating ring gyroscope," Ph.D. dissertation, University of Michigan, 1995.

Trusov et al., "1 PPM precision self-calibration of scale factor in MEMS coriolis vibratory gyroscopes," Transducers & Eurosensors 2013; 17th Int Con. 2013, 2531-2534.

Swanson et al., "Proposed digital, auto ranging, self calibrating inertial sensor," 10th IEEE Sensors Conference, Limerick, Ireland, 2011, pp. 1457-1460.

Rozelle, "The hemispherical resonator gyro: From wineglass to the planets," in AAS/AIAA 2009: The 19th AAS/AIAA Space Flight Mechanics, Savannah, Georgia, 2009, pp. 1157-1178.

Garnier et al., ., Identification of Continuous-time Models from Sampled Data. Springer-Verlag London, 2008.

Kristensen et al., "Parameter estimation in stochastic gray-box models," Automatica, vol. 40, No. 2, pp. 225-237, 2004.

R. Juhl, CTSM-R—Continuous Time Stochastic Modelling for R, 2016 (accessed Apr. 17, 2016). [Online]. Available: http://ctsm.info/.

Lynch, "Vibratory gyro analysis by the method of averaging," in 2nd Saint Petersburg Conf. on Gyro . . . , Saint Petersburg, Russia, May 1995, pp. 26-34.

"IEEE standard specification format guide and test procedure for Coriolis vibratory gyros," IEEE Std 1431-2004, pp. 1-78, 2004.

El-Sheimy et al., "Analysis and modeling of inertial sensors using Allan variance," IEEE Transactions on Instrumentation and Measurement, vol. 57, No. 1, pp. 140-149, 2008.

F. Ayazi and K. Najafi, "A HARPSS polysilicon vibrating ring gyroscope," Journal of Microelectromechanical Systems, vol. 10, No. 2, pp. 169-179, 2001.

* cited by examiner

| Parameter | Value |
|---|---|
| $\omega_1$ | $2\pi 1.02 \times 10^3 \frac{rad}{s}$ |
| $\omega_2$ | $2\pi 0.98 \times 10^3 \frac{rad}{s}$ |
| $\tau_1$ | $2\frac{50.3 \times 10^3}{\omega_1} \frac{1}{s}$ |
| $\tau_2$ | $2\frac{49.7 \times 10^3}{\omega_2} \frac{1}{s}$ |
| $\theta\omega$ | $5°$ |
| $\theta\tau$ | $3°$ |
| $\kappa$ | $0.37$ |

FIG. 6

SIMPLIFIED TIME DOMAIN SWITCHED RING/DISK RESONANT GYROSCOPE

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 104,111.

BACKGROUND OF THE INVENTION

Embodiments of the invention relate to improvements and simplifications in the design of a time domain switched ring/disk resonant gyroscope (TDSRRG).

Gyroscopes are types of sensors used to detect rotation or rotation rate. For such sensors, there is generally a strong correlation between cost, size, weight, power, and performance; specifically, low cost, size, weight, and power generally implies low performance.

There exists a need for a system to lower costs and improve performance of gyroscopes.

SUMMARY OF THE INVENTION

An aspect of the present invention is drawn to a system to simplify and improve the design of a TDSRRG. A gyroscope includes: a support frame; a circular oscillator; a flexible support structure supporting by suspension the circular oscillator to the support frame; a drive mechanism configured to induce the circular oscillator into a two-dimensional driving oscillation; a plurality of movable sections disposed at a perimeter of the circular oscillator; a plurality of digital proximity switches, each disposed near a respective movable section and around the perimeter of the circular oscillator; and a processor. The two-dimensional driving oscillation is modified responsive to an angular rotation of the support frame and the circular oscillator. During the modified drive oscillation, a plurality of the digital proximity switches are configured to switch between an open state and a closed state and generate a time and position output to allow for a determination of each of a plurality of variable oscillation parameters for each oscillation of the modified drive oscillation. The processor is operable to determine the position of each movable section, to determine the plurality of variable oscillation parameters for each oscillation of the modified drive oscillation and to determine the angular rotation of the support frame and the circular oscillator via a parametric system identification method

BRIEF DESCRIPTION OF THE DRAWINGS

The accompanying drawings, which are incorporated in and form a part of the specification, illustrate example embodiments and, together with the description, serve to explain the principles of the invention. In the drawings:

FIG. 6 illustrates parameters used to simulate a TDSRRG in accordance with aspects of the present invention;

DETAILED DESCRIPTION OF THE EMBODIMENTS

The present invention provides a system for simplifying and improving the design of a TDSRRG.

Gyroscopes are sensors that are used to detect presence of rotation or rate of rotation. For these technologies, in general there is a strong correlation between cost, size, weight, power, and performance; specifically, low cost, size, weight, and power (CSWaP) generally imply low performance.

A common type of gyroscope is a microelectromechanical systems (MEMS) gyroscope. Prior art MEMS gyroscopes provide low CSWaP but usually achieve only consumer- or tactical-grade performance. Various types of MEMS gyroscopes exist, but the majority sense rotation via the Coriolis force. A CVG employs a proof mass that is driven into an oscillatory mode; this proof mass is usually a symmetric structure, such as a ring or disk, with several vibratory modes. A CVG senses rotation through energy transferred from one vibratory mode to another vibratory mode due to the Coriolis force that the device experiences while it is being rotated. The amount of energy transferred from one vibratory mode to the other indicates the angular velocity.

There are two classes of CVGs: in class one CVGs, the natural frequencies of the vibratory modes are not matched, while in class two CVGs, the natural frequencies are degenerate, or matched. Class two CVGs, in general, have better performance than class one CVGs. Class two CVGs, however, have several limitations that affect performance. One limitation is that the natural modes may not be exactly matched, and may vary over a range of temperatures and other ambient conditions. Another factor is that the vibratory modes decay over time; this dissipation affects performance. Prior-art CVGs require high quality components and high-vacuum packaging that minimizes dissipation in order to provide navigation-grade performance.

Prior art CVGs directly sense the position of the proof mass and measure the difference in positions between vibratory states and rest states. However, those position sensors require high accuracy and periodic calibration. A TDSRRG, also known as a time domain switching micromachined gyroscope (TDSMG), is a type of CVG that replaces position sensors with time switches. A TDSRRG uses time information instead of position information to describe the state of the proof mass. By measuring time against fixed, known locations of the sensors, an angular velocity of the gyroscope can be calculated.

A system for improving the design and performance of a TDSRRG will now be discussed with reference to FIGS. 1-8 in accordance with aspects of the present invention.

Figure 1A:
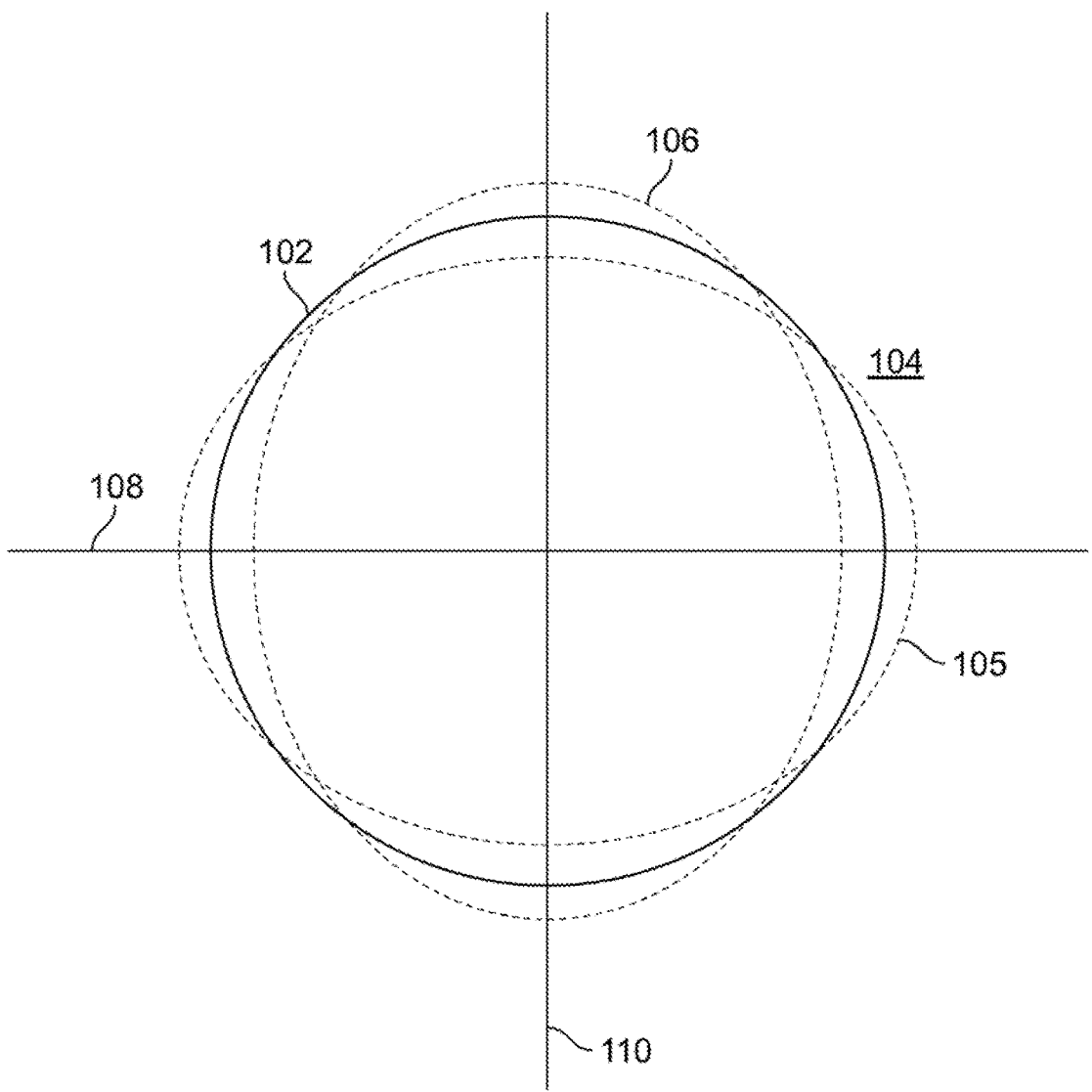
FIGS. 1A-B illustrate a circular oscillator and two modes of oscillation.
Figure 1B:
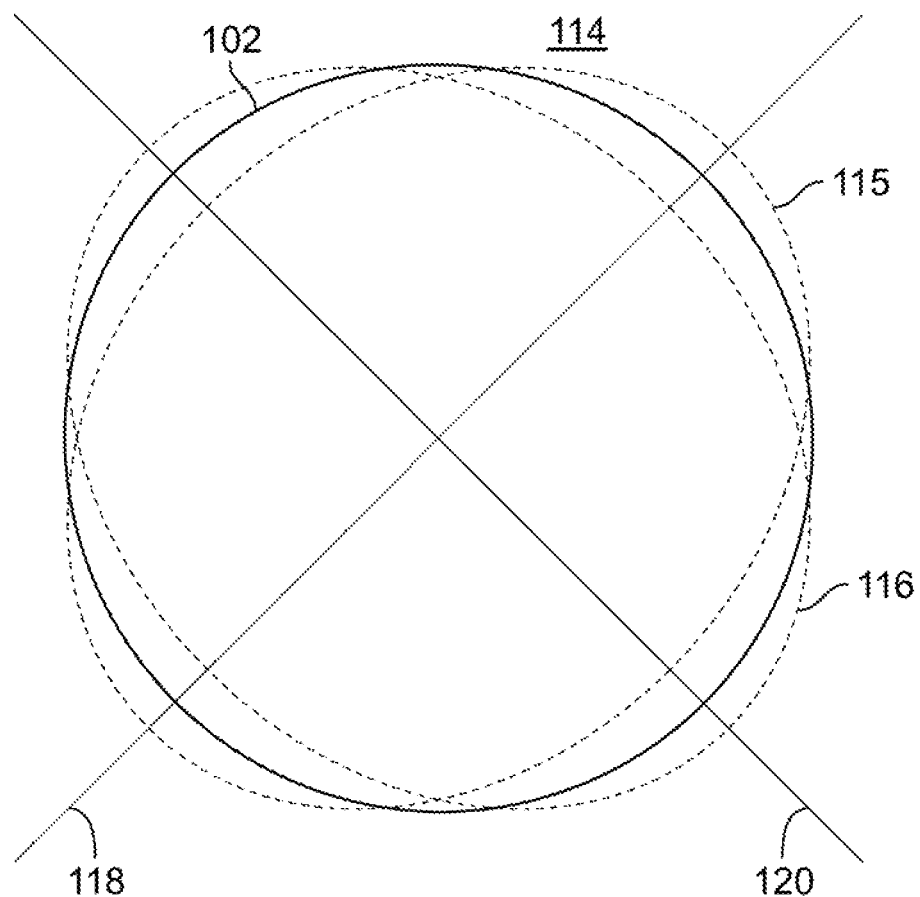

FIGS. 1A-B illustrate a circular oscillator and two modes of oscillation.

Circular oscillator 102 is any structure with eight-fold cyclic symmetry. In this non-limiting example, circular oscillator 102 is a ring made of micromachined silicon.

Circular oscillator 102 may have several modes of oscillation. FIG. 1A illustrates a first mode of oscillation 104. First mode of oscillation 104 has a major axis 108 and a minor axis 110. Major axis 108 corresponds to positive displacement 105 of first mode of oscillation 104. Minor axis 110 corresponds to negative displacement 106 of first mode of oscillation 104.

The operation of circular oscillator 102 will now be described with additional reference to FIG. 1B.

FIG. 1B illustrates a second mode of oscillation 114. Second mode of oscillation 114 has a major axis 118 and a minor axis 120. Major axis 118 corresponds to positive displacement 115 of second mode of oscillation 114. Minor axis 120 corresponds to negative displacement 116 of second mode of oscillation 114.

In this non-limiting example, major axis 108 of first mode of oscillation 104 is displaced from major axis 118 of second mode of oscillation 114 by 45°.

The vibratory behavior of circular oscillator 102 under rotation will now be discussed with reference to FIG. 2.

Figure 2:
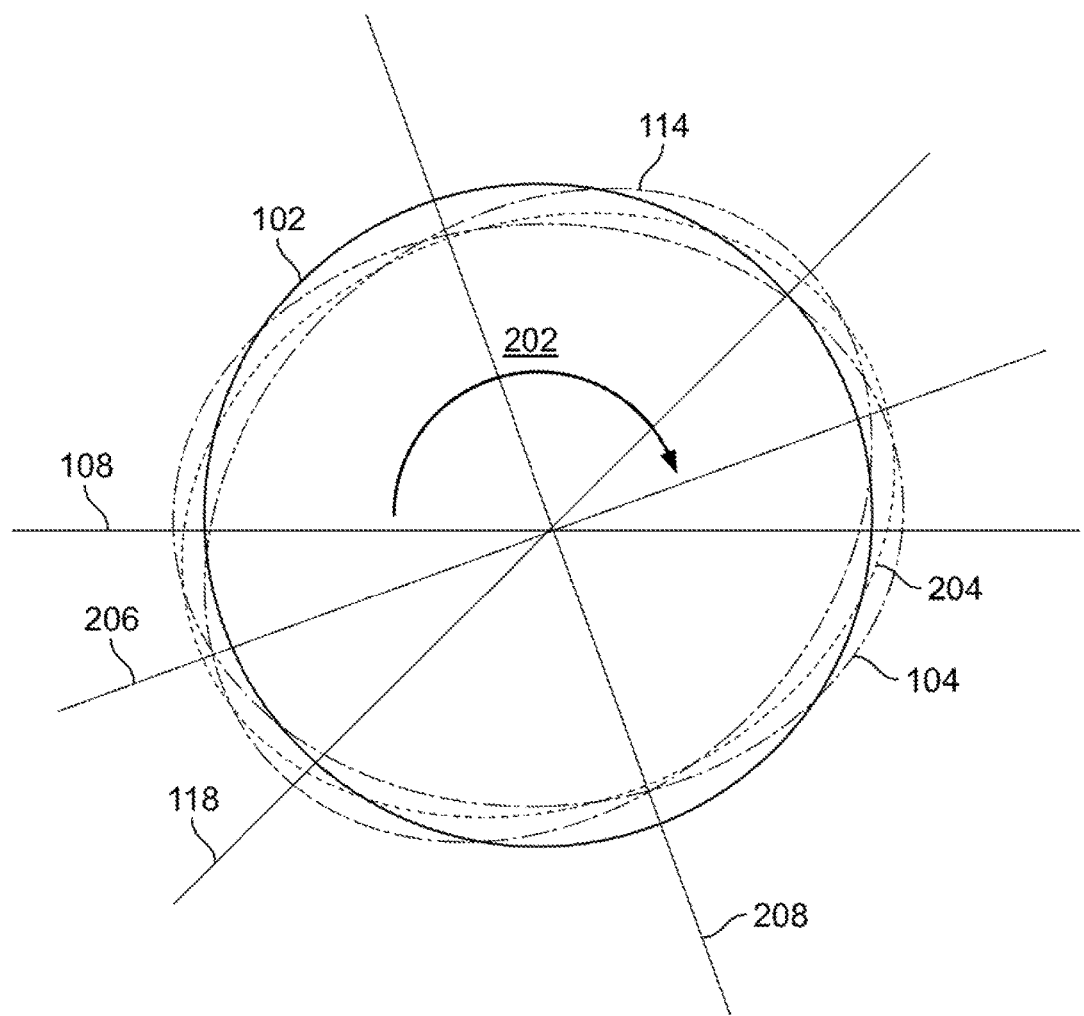
FIG. 2 illustrates a circular oscillator oscillating while being rotated.

FIG. 2 illustrates circular oscillator 102 oscillating while being rotated.

As shown in the figure, circular oscillator 102 is being rotated with rotation 202.

When circular oscillator 102 is oscillating in first mode of oscillation 104, rotation 202 causes a Coriolis force that transfers some energy from first mode of oscillation 104 to second mode of oscillation 114.

The combination of first mode of oscillation 104 and second mode of oscillation 114 results in apparent oscillation 204. Apparent oscillation 204 has a major axis 206 and a minor axis 208.

The amount of displacement of apparent oscillation 204 from first mode of oscillation 104 corresponds to the angular velocity of rotation 202.

FIGS. 1A-B and FIG. 2 illustrate how circular oscillator 102, vibrating in first mode of oscillation 104, can sense rotation 202 by measuring apparent oscillation 204. A time domain switched gyroscope will now be discussed with reference to FIGS. 3-4.

Figure 3:
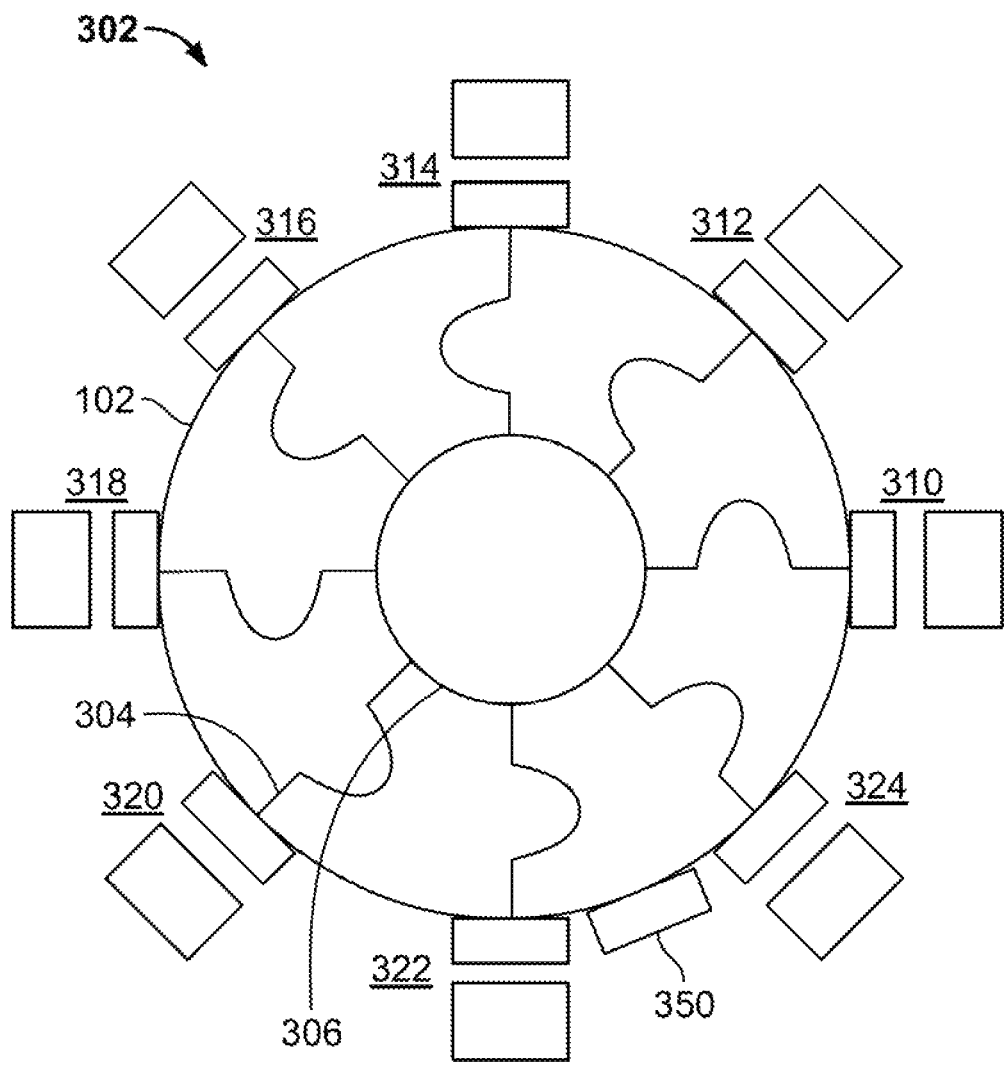
FIG. 3 illustrates a Coriolis vibratory gyroscope (CVG) structure.

FIG. 3 illustrates CVG structure 302.

As shown in the figure, CVG structure 302 contains circular oscillator 102, flexible support structure 304, support frame 306, digital proximity switches 310-324, and drive mechanism 350.

Circular oscillator 102 is attached to support frame 306 by flexible support structure 304. Digital proximity switches 310-324 are disposed around circular oscillator 102. Drive mechanism 350 is disposed to excite circular oscillator 102 into any of its natural modes of oscillation.

Support frame 306 is a solid substance on which sensing devices are built. A non-limiting example of support frame 306 is a post made of micromachined silicon.

Flexible support structure 304 is a structure that allows circular oscillator 102 to move independently of support frame 306. A non-limiting example of support frame 306 is eight springs made of micromachined silicon.

Drive mechanism 350 is any device that can excite circular oscillator 102 into any of its natural modes of oscillation. A non-limiting example of drive mechanism 350 is an electrostatic comb drive.

Digital proximity switches 310-324 are devices that indicate when a particular section of circular oscillator 102 traverses a known location. In the example embodiment, each switch contains a fixed section and a movable section. The fixed section is at a fixed location relative to support frame 306. The movable section is attached to circular oscillator 102. When the fixed and movable sections are in a certain alignment, the switch is said to be closed. A non-limiting example of digital proximity switches 310-324 are capacitive switches. A capacitive switch is closed when its two sections are separated by a minimum distance.

Vibration of circular oscillator 102 causes a subset of digital proximity switches 310-324 to open or close at different points in time. Referring to FIG. 1A, positive displacement 105 will close digital proximity switches 310 and 318. Negative displacement 106 will close digital proximity switches 314 and 322.

Returning to FIG. 3, CVG structure 302 is connected to a processor, which excites the vibratory modes of circular oscillator 102 and processes information from digital proximity switches 310-324. The system of CVG structure 302 and processor will now be discussed with reference to FIG. 4.

Figure 4:
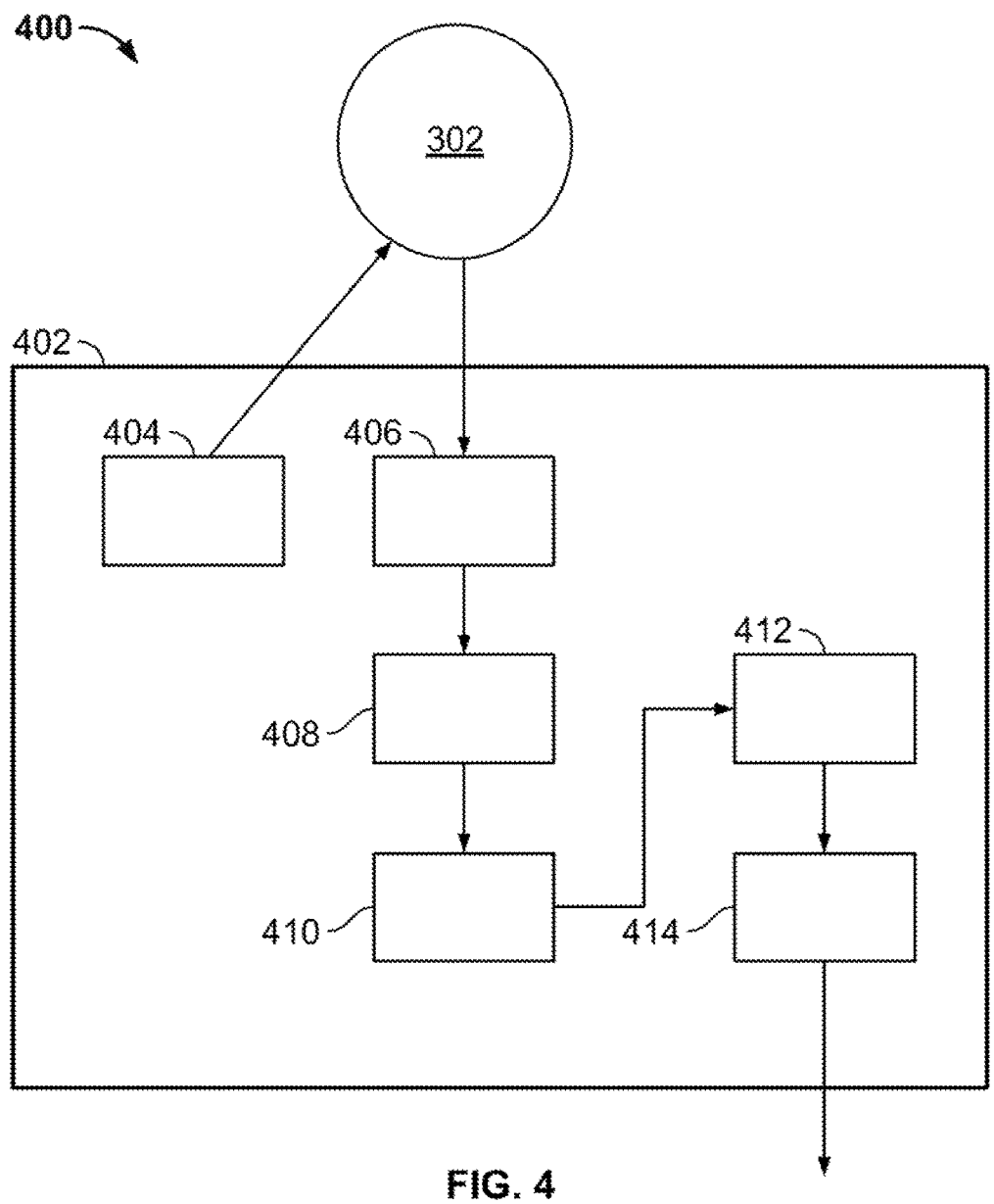
FIG. 4 illustrates a TDSRRG in accordance with aspects of the present invention.

FIG. 4 illustrates TDSRRG 400 in accordance with aspects of the present invention.

TDSRRG 400 contains CVG structure 302 and processor 402.

Processor 402 contains drive component 404, input component 406, position determining component 408, velocity and acceleration determining component 410, angular velocity determining component 412, and output component 414.

Processor 402 is any device that can excite CVG structure 302, convert time information from digital proximity switches 310-324 into digital data, and calculate amount of rotation 202. A non-limiting example of processor 402 is a field-programmable gate array (FPGA) in combination with a microcontroller.

In this non-limiting example embodiment, TDSRRG 400 uses least-squares methods to analyze trigger events and to calculate angular velocity. Other examples of analytical methods include continuous time stochastic modeling.

Referring to FIG. 2, the motion of a generic vibratory gyroscope can be described by Lynch's equations:

$$\ddot{q}_1 - k(2\Omega\dot{q}_2 + \dot{\Omega}q_2) + \frac{2}{\tau}\dot{q}_1 + \qquad (1)$$

$$(\omega^2 - k'\Omega^2)q_1 + \Delta\left(\frac{1}{\tau}\right)(\dot{q}_1\cos(2\theta_\tau) + \dot{q}_2\sin(2\theta_\tau)) -$$

$$\omega\Delta\omega(q_1\cos(2\theta_\omega) + q_2\sin(2\theta_\omega)) = f_1,$$

$$\ddot{q}_2 + k(2\Omega\dot{q}_1 + \dot{\Omega}q_1) + \frac{2}{\tau}\dot{q}_2 + (\omega^2 - k'\Omega^2)q_2 -$$

$$\Delta\left(\frac{1}{\tau}\right)(-\dot{q}_1\sin(2\theta_\tau) + \dot{q}_2\cos(2\theta_\tau)) -$$

$$\omega\Delta\omega(-q_1\sin(2\theta_\omega) + q_2\cos(2\theta_\omega)) = f_2$$

where $q_1$ and $q_2$ are displacements of first and second modal coordinates, corresponding to first mode of oscillation 104 and second mode of oscillation 114, respectively; $\Omega$ is angular velocity of rotation 202; $f_1$ and $f_2$ denote generalized forces for first mode of oscillation 104 and second mode of oscillation 114, respectively; k denotes angular gain that accounts for the Coriolis force and angular acceleration, and also accounts for centripetal forces; $\theta_\omega$ accounts for misalignment of mode shapes; and $\theta_\tau$ accounts for a non-trivial damping axis.

Since TDSRRG 400 is designed such that the natural frequencies and time constants of first mode of oscillation 104 and second mode of oscillation 114 are similar, equation (1) can be written using average and difference values of the natural frequencies and time constants:

$$\omega^2 = \frac{\omega_1^2 + \omega_2^2}{2}, \tag{2}$$

$$\frac{1}{\tau} = \frac{1}{2}\left(\frac{1}{\tau_1} + \frac{1}{\tau_2}\right),$$

$$\omega\Delta\omega = \frac{\omega_1^2 - \omega_2^2}{2},$$

$$\Delta\left(\frac{1}{\tau}\right) = \frac{1}{\tau_1} - \frac{1}{\tau_2}.$$

where $\omega_1$ and $\omega_2$ are the natural frequencies of first mode of oscillation 104 and second mode of oscillation 114, respectively; and $\tau_1$ and $\tau_2$ are time constants of first mode of oscillation 104 and second mode of oscillation 114, respectively.

Ignoring effects associated with angular acceleration and centripetal acceleration and treating the quantity $2 k\Omega$ as a single quantity, equation (1) has seven parameters. Assuming that over a given period of time that these parameters are stationary and that only the free response of TDSRRG 400 is considered, with four or more estimates for position, velocity, and acceleration, or state, of both modal coordinates at specific times, one can use linear least-squares methods to estimate these parameters. That is, parameter estimates can be found by solving the following equation in a least-squares sense $$\begin{bmatrix} q_1 & -q_1 & -q_2 & \dot{q}_1 & \dot{q}_1 & \dot{q}_2 & -\dot{q}_2 \\ q_2 & q_2 & -q_1 & \dot{q}_2 & -\dot{q}_2 & \dot{q}_1 & \dot{q}_1 \\ & & & \vdots & & & \end{bmatrix} \begin{bmatrix} \omega^2 \\ \omega\Delta\omega\cos(2\theta_\omega) \\ \omega\Delta\omega\sin(2\theta_\omega) \\ \dfrac{2}{\tau} \\ \Delta\left(\dfrac{1}{\tau}\right)\cos(2\theta_\tau) \\ \Delta\left(\dfrac{1}{\tau}\right)\sin(2\theta_\tau) \\ 2k\Omega \end{bmatrix} = \begin{bmatrix} -\ddot{q}_1 \\ -\ddot{q}_2 \\ \vdots \end{bmatrix}, \tag{3}$$

where the ellipses denote further measurements of the state.

If equation (1) is rewritten in matrix form $$\dot{z} = [A]z, \tag{4}$$

where $z = [q_1 \dot{q}_1 q_2 \dot{q}_2]^T$, the homogeneous solution is of the form $$z = \sum_{i=1}^{4} c_i v_i e^{\lambda_i t} \tag{5}$$

where $v_i$ and $\lambda_i$ correspond to the i-th eigenvector and eigenvalue of $[A]$, respectively, and the $c_i$ are used to account for initial conditions. As $[A]$ contains just real values and is of rank four, the eigenvectors and eigenvalues of $[A]$ come in complex conjugate pairs. Since only real initial conditions are of concern, it can be shown that the general form of the modal coordinates for the unforced version of equation (1) is $$q = A_1 e^{-\alpha_1 t}\cos\left(\frac{2\pi t}{T_1}\right) + B_1 e^{-\alpha_1 t}\sin\left(\frac{2\pi t}{T_1}\right) + \tag{6}$$

-continued
$$A_2 e^{-\alpha_2 t}\cos\left(\frac{2\pi t}{T_2}\right) + B_2 e^{-\alpha_2 t}\sin\left(\frac{2\pi t}{T_2}\right)$$

Equation (6) may be differentiated to determine velocity and acceleration.

A method of estimating parameters of equation (1) and solving for $\Omega$ will now be discussed with reference to FIG. 5.

Figure 5:
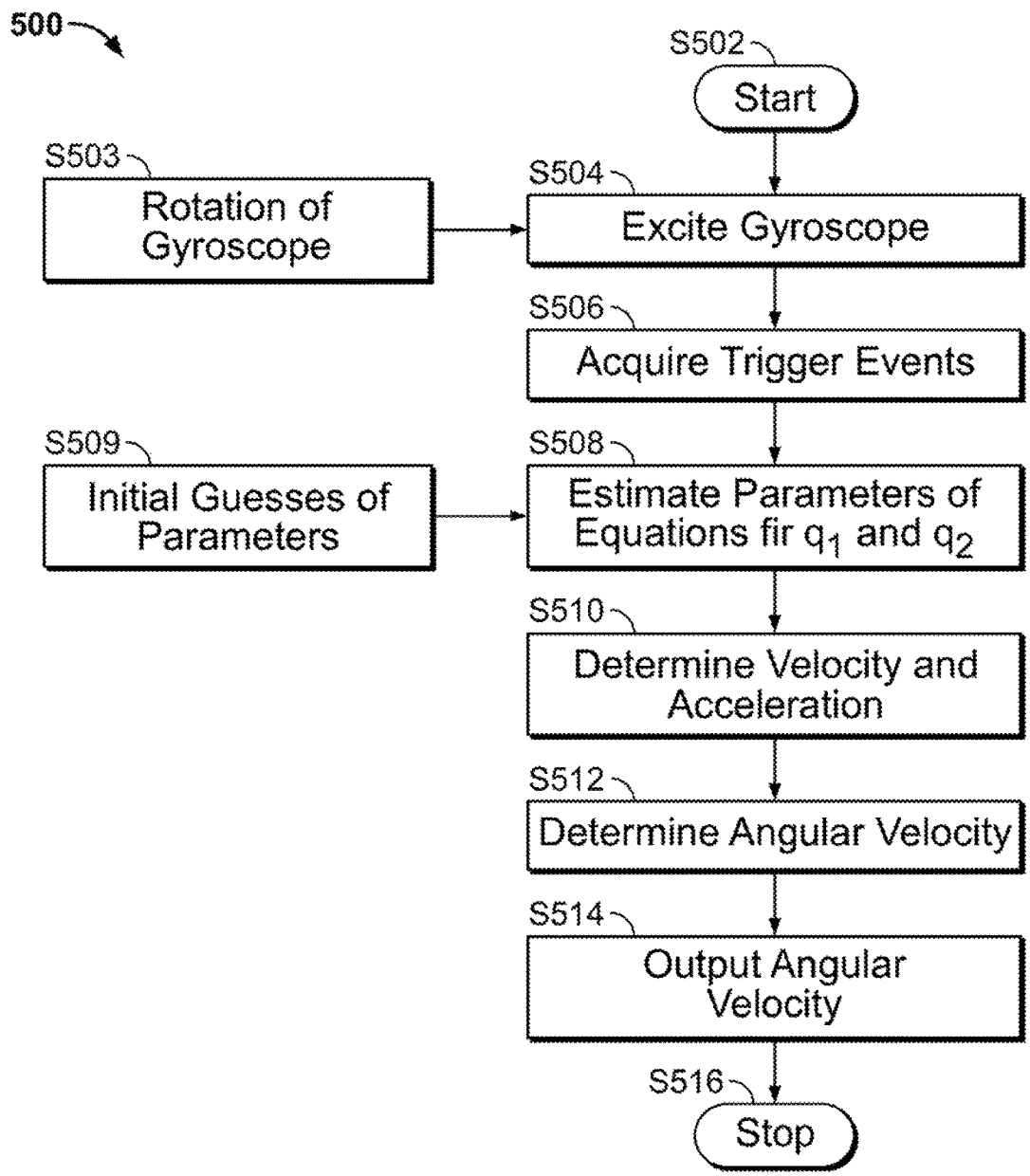
FIG. 5 illustrates a process for determining an angular velocity of a TDSRRG in accordance with aspects of the present invention.

FIG. 5 illustrates a process for determining an angular velocity of TDSRRG 400 in accordance with aspects of the present invention.

The method involves first acquiring a sufficient number of trigger events, which contain time information and position of the switches; using the trigger events to estimate the parameters of equation (6); determining velocity and acceleration of the modal coordinates; and using the estimates for position, velocity, and acceleration of the modal coordinates to solve for $\Omega$ in equation (3).

Process 500 starts (S502) with drive component 404 exciting CVG structure 302 (S504) to vibrate in first mode of oscillation 104. CVG structure 302 is already rotating at rotation 202 (S503).

Input component 406 collects trigger events from digital proximity switches 310-324 (S506).

Position determining component 408 estimates parameters for equation (6) (S508). In the example embodiment, the manner to estimate parameters in equation (6) is based on non-linear least squares methods. Thus, initial guesses for these parameters are needed (S509).

In the example embodiment, averages from previous iterations are used as initial guesses for parameters of equation (6). Simulations show that initial guesses may be perturbed by 50% relative to the exact values of the parameters of equation (6) without significant effects on the final results.

In the example embodiment, a simplification may be made if linear acceleration of CVG structure 302 need not be considered. Referring to FIG. 3, without linear acceleration, redundant information is available from switches on opposite sides of circular oscillator 102; for example, digital proximity switch 310 closes at the same time as digital proximity switch 318. In the absence of linear acceleration, trigger events need only be collected from digital proximity switches 310-316.

Returning to FIG. 5, velocity and acceleration determining component 410 then determines velocity and acceleration by calculating the first and second derivatives of equation (6) (S510).

Angular velocity determining component 412 then determines angular velocity $\Omega$ by solving for equation (3) (S512). In the example embodiment, linear least-squares methods are used to estimate the parameters of equation (3).

Output component 414 outputs angular velocity $\Omega$ (S514) and process 500 stops (S516).

FIG. 5 illustrates a process for capturing trigger events, estimating parameters of equation 6 and equation (3), and calculating angular velocity $\Omega$. Simulations of an example embodiment of TDSRRG 400 will be discussed with reference to FIGS. 6-8.

Referring to FIG. 3, the example embodiment is modeled with the following characteristics: circular oscillator 102 is made of silicon, with thickness of 30 μm and radius of 5700 μm; support frame 306 has a radius of 300 μm; springs contained in flexible support structure 304 have a radius of 2600 μm and a width of 11 μm; the posts connecting springs of flexible support structure 304 to support frame 306 are 100 μm long and 11 μm wide; and the switch gaps of digital proximity switches 310-324 are 100 μm. The natural frequency of first mode of oscillation 104 and second mode of oscillation 114 is estimated to be approximately 996 Hz.

FIG. 6 illustrates other parameters used to simulate TDSRRG 400.

An important metric used to characterize gyroscopes is angular random walk (ARW). ARW is a measure of how far the rate estimate of a gyroscope deviates in the absence of rotation due to high-frequency noise. The lower the ARW, the better the gyroscope. ARW may be influenced by several factors: two that are described here are timing or position jitter, and length of the data window.

In prior art CVGs, position of the vibrating element is measured directly and used to calculate angular velocity. Errors or noise in this position measurement lead to an increase in ARW. In TDSRRG 400, position measurement is replaced by time measurement.

Timing jitter is the error between the measured time and the actual time of a trigger event. Timing jitter can arise from inaccuracies in CVG structure 302 or input component 406.

At a temperature of 300 K, simulations show that the standard deviation of displacements due to thermomechanical noise is $1.06 \times 10^{-5}$ μm. This puts the effects of thermomechanical noise on par with 10 ps of timing jitter.

Figure 7A:
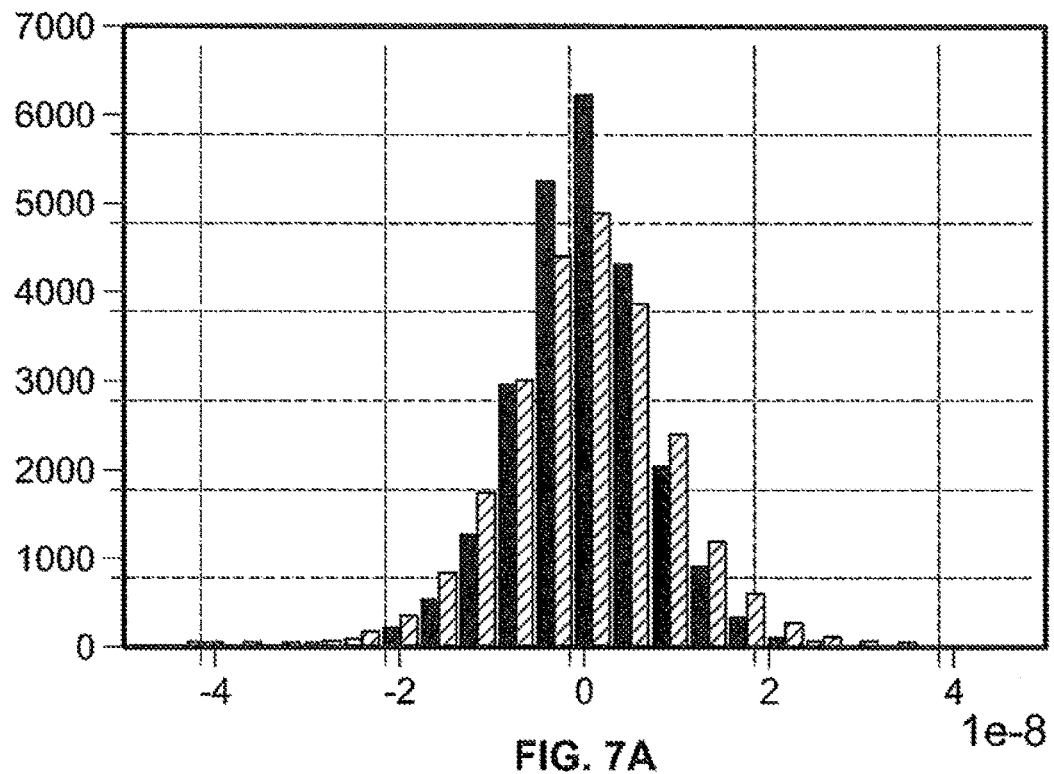
FIGS. 7A-B illustrate a relationship between timing jitter and position error of a TDSRRG in accordance with aspects of the present invention.
Figure 7B:
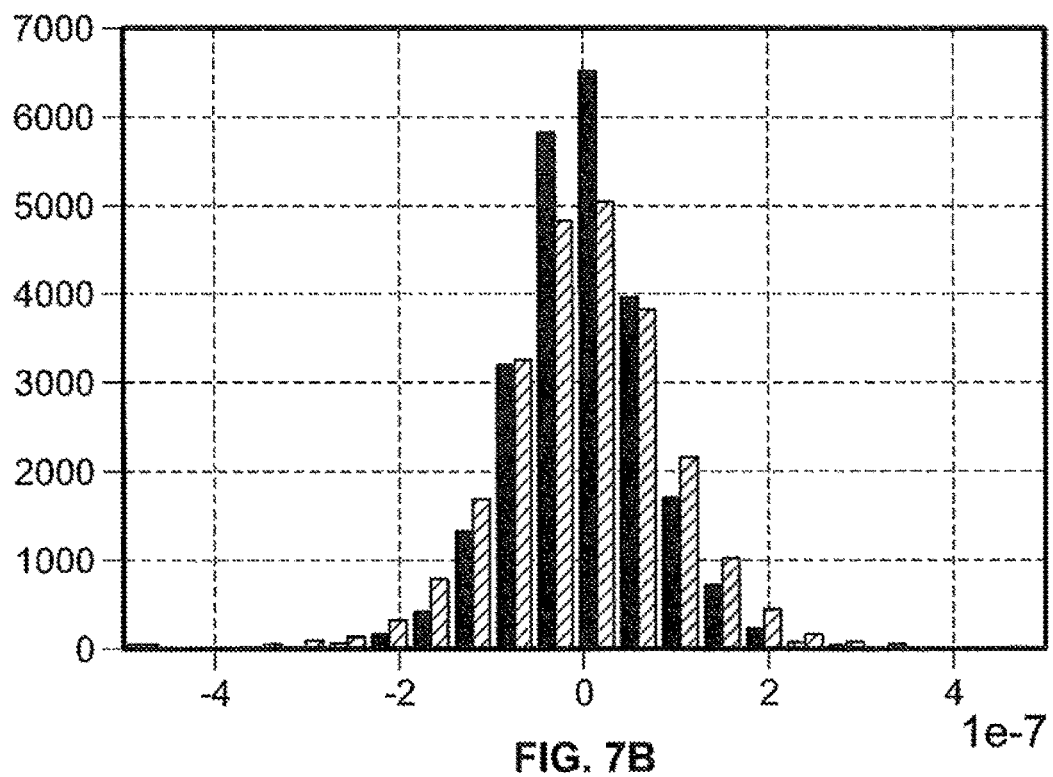

FIGS. 7A-B are histograms that illustrate the relationship between timing jitter and position error. The x-axis shows position error, expressed in terms of gap distance of digital switches 310-324, where the gap distance is normalized to 1 unit. Black bars denote position errors of $q_1$ and white bars denote position errors of $q_2$. FIG. 7A illustrates a distribution of position errors for a timing jitter of 1 ps. FIG. 7B illustrates a distribution of position errors for a timing jitter of 10 ps. The standard deviation of position errors plotted in FIG. 7B is about ten times that for FIG. 7A; that is, position error scales linearly with timing jitter. Thus, for the least-squares methods illustrated in FIGS. 4-5, ARW scales linearly with timing jitter.

FIGS. 7A-B illustrate the relationship between timing jitter and position jitter, and thus ARW. The relationship between data window length and ARW will now be discussed with reference to FIG. 8.

Figure 8:
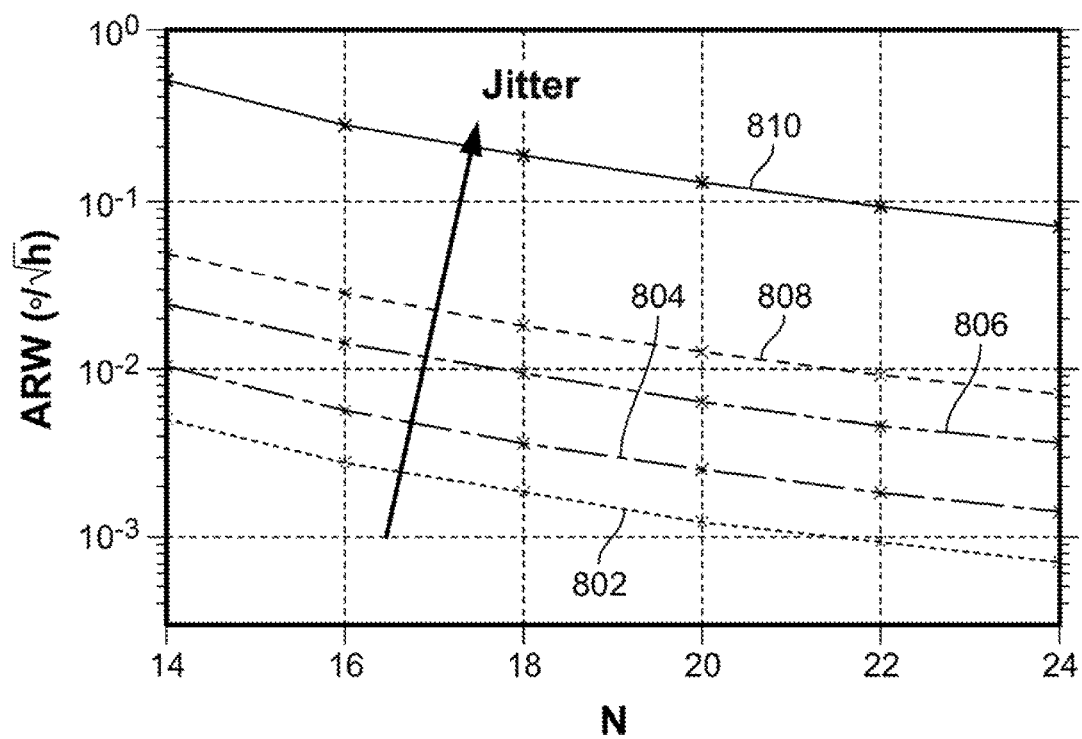
FIG. 8 illustrates a relationship between angular random walk, data window length, and timing jitter of a TDSRRG in accordance with aspects of the present invention.

FIG. 8 illustrates the relationship between data window length, timing jitter, and ARW.

As shown in FIG. 8, N is the data window length, or the length of data used to fit the model given in equation (6). The y-axis denotes ARW, measured in degrees per root hour. Line 802, line 804, line 806, line 808, and line 810 correspond to 1, 2, 5, 10, and 100 ps of jitter, respectively. For N=24 and 10 ps of timing jitter, the simulation indicates that ARW approaches navigation-grade performance.

In general, increasing N lengthens the response time and decreases bandwidth of TDSRRG 400. N may be dynamically adjusted to balance ARW, delay, and bandwidth requirements. Thus, TDSRRG 400 may be tuned to suit a variety of applications.

In summary, there exists a need to improve the design and performance metrics of gyroscopes. Prior art CVGs use position measurements of an oscillating proof mass to detect rotation, but require high quality components and constant recalibration. Time domain switched CVGs replace position measurements with time measurements.

The invention presents a system for improving the design and performance of a TDSRRG. This invention simplifies detection needs of the sensor by reducing the number of digital proximity switches, simplifies fabrication of the mechanical structure by allowing for imperfections and reduced vacuum packaging, and allows for better performance, including the ability to dynamically adjust ARW. Simulations of TDSRRG 400 indicate the ability to approach navigation-grade performance without the need for high-quality components.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A gyroscope comprising:
a support frame;
a circular oscillator;
a flexible support structure supporting by suspension said circular oscillator to said support frame;
a drive mechanism configured to induce said circular oscillator into a two-dimensional driving oscillation;
a plurality of movable sections disposed at a perimeter of said circular oscillator;
a plurality of digital proximity switches, each disposed near a respective movable section and around the perimeter of said circular oscillator; and
a processor,
wherein the two-dimensional driving oscillation is modified responsive to an angular rotation of said support frame and said circular oscillator,
wherein during the modified drive oscillation a plurality of the digital proximity switches are configured to switch between an open state and a closed state and generate a time and position output to allow for a determination of each of a plurality of variable oscillation parameters of the modified drive oscillation,
wherein said processor is operable to determine the position of each movable section, to determine the plurality of variable oscillation parameters of the modified drive oscillation and to determine the angular rotation of said support frame and said circular oscillator via a parametric system identification method,
wherein said plurality of movable sections comprises four movable sections disposed at the perimeter of said circular oscillator,
wherein said plurality of digital proximity switches comprises four digital proximity switches,
wherein said drive mechanism is further configured to induce said circular oscillator into the two-dimensional driving oscillation as a linear combination of a first mode of oscillation and a second mode of oscillation,
wherein the first mode of oscillation is perpendicular to the second mode of oscillation,
wherein said processor is operable to determine the position, q(t), of each movable section as a function of time, t, by solving differential equation $$q = A_1 e^{-\alpha_1 t} \cos\left(\frac{2\pi t}{T_1}\right) +$$
$$B_1 e^{-\alpha_1 t} \sin\left(\frac{2\pi t}{T_1}\right) + A_2 e^{-\alpha_2 t} \cos\left(\frac{2\pi t}{T_2}\right) + B_2 e^{-\alpha_2 t} \sin\left(\frac{2\pi t}{T_2}\right)$$

wherein $\alpha_1$ to $\alpha_2$, $T_1$, $T_2$, $A_1$, $B_1$, $A_2$ and $B_2$ are solved using a least-squares estimate.

2. The gyroscope of claim 1,
wherein said processor is further operable to determine a velocity of each movable section as a function of time, t, from q(t), and
wherein said processor is further operable to determine an acceleration of each movable section as a function of time, t, from the determined velocity.

3. The gyroscope of claim 2,
wherein said processor is further operable to determine an angular velocity of the gyroscope, $\Omega$, by solving equation $$\begin{bmatrix} q_1 & -q_1 & -q_2 & \dot{q}_1 & \dot{q}_1 & \dot{q}_2 & -\dot{q}_2 \\ q_2 & q_2 & -q_1 & \dot{q}_2 & -\dot{q}_2 & \dot{q}_1 & \dot{q}_1 \\ & & & \vdots & & & \end{bmatrix} \begin{bmatrix} \omega^2 \\ \omega\Delta\omega\cos(2\theta_\omega) \\ \omega\Delta\omega\sin(2\theta_\omega) \\ \dfrac{2}{\tau} \\ \Delta\left(\dfrac{1}{\tau}\right)\cos(2\theta_\tau) \\ \Delta\left(\dfrac{1}{\tau}\right)\sin(2\theta_\tau) \\ 2k\Omega \end{bmatrix} = \begin{bmatrix} -\ddot{q}_1 \\ -\ddot{q}_2 \\ \vdots \end{bmatrix},$$

wherein k is angular gain, $\theta_T$ is damping of the first mode of oscillation, $\theta_\omega$ is damping of the second mode of oscillation, $\Delta(1/\tau)$ is mismatch of harmonic damping between the first mode of oscillation and the second mode of oscillation, $\omega$ is frequency of oscillation, and $\Delta\omega$ is change in the frequency of oscillation.

4. The gyroscope of claim 1,
wherein said drive mechanism is further configured to induce said circular oscillator into the two-dimensional driving oscillation as a linear combination of a first mode of oscillation and a second mode of oscillation,
wherein the first mode of oscillation is perpendicular to the second mode of oscillation,
wherein said processor is operable to determine the position, q(t), of each movable section as a function of time, t, by solving differential equation $$q = A_1 e^{-\alpha_1 t} \cos\left(\frac{2\pi t}{T_1}\right) +$$
$$B_1 e^{-\alpha_1 t} \sin\left(\frac{2\pi t}{T_1}\right) + A_2 e^{-\alpha_2 t} \cos\left(\frac{2\pi t}{T_2}\right) + B_2 e^{-\alpha_2 t} \sin\left(\frac{2\pi t}{T_2}\right)$$

wherein $\alpha_1$ to $\alpha_2$, $T_1$, $T_2$, $A_1$, $B_1$, $A_2$ and $B_2$ are solved using a least-squares estimate.

5. The gyroscope of claim 4,
wherein said processor is further operable to determine a velocity of each movable section as a function of time, t, from q(t), and
wherein said processor is further operable to determine the acceleration of each movable section as a function of time, t, from the determined velocity.

6. The gyroscope of claim 5,
wherein said processor is further operable to determine the angular velocity of the gyroscope, $\Omega$, by solving equation $$\begin{bmatrix} q_1 & -q_1 & -q_2 & \dot{q}_1 & \dot{q}_1 & \dot{q}_2 & -\dot{q}_2 \\ q_2 & q_2 & -q_1 & \dot{q}_2 & -\dot{q}_2 & \dot{q}_1 & \dot{q}_1 \\ & & & \vdots & & & \end{bmatrix} \begin{bmatrix} \omega^2 \\ \omega\Delta\omega\cos(2\theta_\omega) \\ \omega\Delta\omega\sin(2\theta_\omega) \\ \dfrac{2}{\tau} \\ \Delta\left(\dfrac{1}{\tau}\right)\cos(2\theta_\tau) \\ \Delta\left(\dfrac{1}{\tau}\right)\sin(2\theta_\tau) \\ 2k\Omega \end{bmatrix} = \begin{bmatrix} -\ddot{q}_1 \\ -\ddot{q}_2 \\ \vdots \end{bmatrix},$$

wherein k is angular gain, $\theta_T$ is damping of the first mode of oscillation, $\theta_\omega$ is the damping of the second mode of oscillation, $\Delta(1/\tau)$ is mismatch of harmonic damping between the first mode of oscillation and the second mode of oscillation, $\omega$ is frequency of oscillation, and $\Delta\omega$ is change in the frequency of oscillation.

7. A method of detecting rotation via a gyroscope, said method comprising:
fabricating a support frame;
fabricating a circular oscillator;
fabricating a flexible support structure supporting by suspension the circular oscillator to the support frame;
disposing a plurality of movable sections at a perimeter of the circular oscillator;
disposing a plurality of digital proximity switches, each being disposed near a respective movable section and around the perimeter of the circular oscillator;
inducing, via a drive mechanism, the circular oscillator into a two-dimensional driving oscillation;
rotating the support frame and the circular oscillator so as to modify the two-dimensional driving oscillation;
switching the plurality of the digital proximity switches between an open state and a closed state to generate a time and position output to allow for a determination of each of a plurality of variable oscillation parameters of the modified drive oscillation; and
determining, via a processor, a position of each movable section, the plurality of variable oscillation parameters of the modified drive oscillation and an angular rotation of the support frame and the circular oscillator using a parametric system identification method,
wherein said disposing a plurality of movable sections at a perimeter of the circular oscillator comprises disposing four movable sections equidistantly at the perimeter of the circular oscillator,
wherein said disposing a plurality of digital proximity switches, each being disposed near a respective movable section and around the perimeter of the circular oscillator comprises disposing four digital proximity switches,
wherein said inducing, via a drive mechanism, the circular oscillator into a two-dimensional driving oscillation comprises inducing the circular oscillator into the two-dimensional driving oscillation as a linear combination of a first mode of oscillation and a second mode of oscillation,
wherein the first mode of oscillation is perpendicular to the second mode of oscillation, wherein said determining, via a processor, the position of each movable section, the plurality of variable oscillation parameters of the modified drive oscillation and the angular rotation of the support frame and the circular oscillator using a parametric system identification method comprises determining the position, q(t), of each movable section as a function of time, t, by solving differential equation $$q = A_1 e^{-\alpha_1 t} \cos\left(\frac{2\pi t}{T_1}\right) + B_1 e^{-\alpha_1 t} \sin\left(\frac{2\pi t}{T_1}\right) + A_2 e^{-\alpha_2 t} \cos\left(\frac{2\pi t}{T_2}\right) + B_2 e^{-\alpha_2 t} \sin\left(\frac{2\pi t}{T_2}\right)$$

wherein $\alpha_1$ to, $\alpha_2$, $T_1$, $T_2$, $A_1$, $B_1$, $A_2$ and $B_2$ are solved using a least-squares estimate.

8. The method of claim 7, further comprising:
determining, via the processor, a velocity of each movable section as a function of time, t, from q(t); and
determining, via the processor, an acceleration of each movable section as a function of time, t, from the determined velocity.

9. The method of claim 8, further comprising:
determining, via the processor, an angular velocity of the gyroscope, $\Omega$, by solving equation $$\begin{bmatrix} q_1 & -q_1 & -q_2 & \dot{q}_1 & \dot{q}_1 & \dot{q}_2 & -\dot{q}_2 \\ q_2 & q_2 & -q_1 & \dot{q}_2 & -\dot{q}_2 & \dot{q}_1 & \dot{q}_1 \\ & & & \vdots & & & \end{bmatrix} \begin{bmatrix} \omega^2 \\ \omega\Delta\omega\cos(2\theta_\omega) \\ \omega\Delta\omega\sin(2\theta_\omega) \\ \dfrac{2}{\tau} \\ \Delta\left(\dfrac{1}{\tau}\right)\cos(2\theta_\tau) \\ \Delta\left(\dfrac{1}{\tau}\right)\sin(2\theta_\tau) \\ 2k\Omega \end{bmatrix} = \begin{bmatrix} -\ddot{q}_1 \\ -\ddot{q}_2 \\ \vdots \end{bmatrix},$$

wherein k is angular gain, $\theta_T$ is damping of the first mode of oscillation, $\theta_\omega$ is damping of the second mode of oscillation, $\Delta(1/\tau)$ is mismatch of harmonic damping between the first mode of oscillation and the second mode of oscillation, co is frequency of oscillation, and $\Delta\omega$ is change in the frequency of oscillation.

10. A method of detecting rotation via a gyroscope, said method comprising:
fabricating a support frame;
fabricating a circular oscillator;
fabricating a flexible support structure supporting by suspension the circular oscillator to the support frame;
disposing a plurality of movable sections at a perimeter of the circular oscillator;
disposing a plurality of digital proximity switches, each being disposed near a respective movable section and around the perimeter of the circular oscillator;
inducing, via a drive mechanism, the circular oscillator into a two-dimensional driving oscillation;
rotating the support frame and the circular oscillator so as to modify the two-dimensional driving oscillation;
switching the plurality of the digital proximity switches between an open state and a closed state to generate a time and position output to allow for a determination of each of a plurality of variable oscillation parameters of the modified drive oscillation; and
determining, via a processor, a position of each movable section, the plurality of variable oscillation parameters of the modified drive oscillation and an angular rotation of the support frame and the circular oscillator using a parametric system identification method,
wherein said inducing, via a drive mechanism, the circular oscillator into a two-dimensional driving oscillation comprises inducing the circular oscillator into the two-dimensional driving oscillation as a linear combination of a first mode of oscillation and a second mode of oscillation,
wherein the first mode of oscillation is perpendicular to the second mode of oscillation,
wherein said determining, via a processor, the position of each movable section, the plurality of variable oscillation parameters of the modified drive oscillation and the angular rotation of the support frame and the circular oscillator using a parametric system identification method comprises determining the position, q(t), of each movable section as a function of time, t, by solving differential equation $$q = A_1 e^{-\alpha_1 t} \cos\left(\frac{2\pi t}{T_1}\right) + B_1 e^{-\alpha_1 t} \sin\left(\frac{2\pi t}{T_1}\right) + A_2 e^{-\alpha_2 t} \cos\left(\frac{2\pi t}{T_2}\right) + B_2 e^{-\alpha_2 t} \sin\left(\frac{2\pi t}{T_2}\right)$$

wherein $\alpha_1$ to, $\alpha_2$, $T_1$, $T_2$, $A_1$, $B_1$, $A_2$ and $B_2$ are solved using a least-squares estimate.

11. The method of claim 10, further comprising:
determining, via the processor, the velocity of each movable section as a function of time, t, from q(t); and
determining, via the processor, an acceleration of each movable section as a function of time, t, from the determined velocity.

* * * * *